United States Patent
Wu

(10) Patent No.: US 12,536,363 B1
(45) Date of Patent: Jan. 27, 2026

(54) PERFORMING TIME-EFFICIENT CLOCK ENGINEERING CHANGE ORDERS (ECO)

(71) Applicant: Synopsys, Inc., Sunnyvale, CA (US)

(72) Inventor: Meng-Fan Wu, Hsinchu (TW)

(73) Assignee: Synopsys, Inc., Sunnyvale, CA (US)

( * ) Notice: Subject to any disclaimer, the term of this patent is extended or adjusted under 35 U.S.C. 154(b) by 551 days.

(21) Appl. No.: 18/147,146

(22) Filed: Dec. 28, 2022

Related U.S. Application Data

(60) Provisional application No. 63/297,626, filed on Jan. 7, 2022.

(51) Int. Cl.
*G06F 30/396* (2020.01)
*G06F 1/06* (2006.01)
*G06F 30/3312* (2020.01)
*G06F 30/367* (2020.01)
*G06F 30/398* (2020.01)

(52) U.S. Cl.
CPC .............. *G06F 30/396* (2020.01); *G06F 1/06* (2013.01); *G06F 30/3312* (2020.01); *G06F 30/367* (2020.01); *G06F 30/398* (2020.01)

(58) Field of Classification Search
CPC .. G06F 30/396; G06F 30/3312; G06F 30/367; G06F 30/398; G06F 1/06
USPC ...................... 716/113, 110, 136; 703/16, 19
See application file for complete search history.

(56) References Cited

U.S. PATENT DOCUMENTS

| | | | | |
|---|---|---|---|---|
| 6,633,621 B1 * | 10/2003 | Bishop | ...................... | G04G 7/00 375/376 |
| 6,717,447 B1 * | 4/2004 | Le | .......................... | H03L 7/0814 327/161 |
| 6,918,050 B2 * | 7/2005 | Yoshikawa | ........... | H03L 7/0814 713/401 |
| 7,137,022 B2 * | 11/2006 | Ishikawa | ................ | G11C 7/106 713/400 |
| 9,411,912 B1 * | 8/2016 | Sood | ......................... | G06F 1/10 |
| 10,755,758 B2 * | 8/2020 | Ishibashi | .............. | G11C 7/1087 |
| 2003/0005345 A1 * | 1/2003 | Fletcher | .................... | G06F 1/06 713/401 |
| 2011/0242914 A1 * | 10/2011 | Ito | ........................ | H03K 5/1504 365/194 |

FOREIGN PATENT DOCUMENTS

| | | | | |
|---|---|---|---|---|
| CN | 109257040 A | * | 1/2019 | ..... H03K 19/018571 |
| JP | H04357513 A | * | 12/1992 | |
| JP | 4795032 B2 | * | 10/2011 | ............... H03K 5/26 |

\* cited by examiner

*Primary Examiner* — Phallaka Kik
(74) *Attorney, Agent, or Firm* — Weaver Austin Villeneuve & Sampson LLP

(57) ABSTRACT

Methods and apparatus for obtaining timing adjustment values for clock points in a clock network are disclosed. In some embodiments, engineering change order (ECO) may be performed in a time- and resource-efficient manner by selecting candidate clock points from a plurality of clock points in the clock network, and performing enumerative and iterative tests on the selected candidate clock points to determine a combination of timing delay adjustment values that most reduces negative slack. The determined timing delay adjustment values may be implemented by an ECO system to effect changes to the clock network and reduce timing violations therein.

20 Claims, 8 Drawing Sheets

PERFORMING TIME-EFFICIENT CLOCK ENGINEERING CHANGE ORDERS (ECO)

CROSS-REFERENCE TO RELATED APPLICATIONS

This application claims the benefit of U.S. Provisional Application No. 63/297,626, entitled "PERFORMING TIME-EFFICIENT CLOCK ENGINEERING CHANGE ORDERS (ECO)" and filed Jan. 7, 2022, which is incorporated herein by reference in its entirety.

TECHNICAL FIELD

The present disclosure relates to an electronic design automation (EDA) system and, more particularly, to physical design and optimization of clock networks in integrated circuit (IC) design.

BACKGROUND

In design and manufacture of ICs, engineering change orders (ECOs) are used to fix logic and/or timing errors (e.g., among clocks in a clock network), or to reduce power and/or utilization rate. An ECO system may provide changes to the IC design to modify a gate-level, post synthesis version of the IC design. For example, an ECO file may contain instructions for a series of operations. These operations allow an IC design to be fine-tuned to fix an error from a register transfer level (RTL) (pre-synthesis) version of the IC design; achieve optimization, e.g., increased performance or efficient power usage; and/or update the IC design. Determining the values that drive these design changes presents a challenge for complex IC clock network topologies that currently require resource- and time-inefficient optimization processes.

SUMMARY

In one aspect of the present disclosure, a method for obtaining timing delay adjustment values for clock points in a clock network is disclosed. In some embodiments, the method may include: selecting a set of one or more candidate clock points from a plurality of clock points of the clock network; and determining, by a processing device, a desired combination of timing delay adjustment values using each candidate clock point in the set of one or more candidate clock points, by: performing a first plurality of iterations with respect to initial timing delay adjustment values by creating a plurality of combinations of the initial timing delay adjustment values for the set of one or more candidate clock points, wherein a different combination of the initial timing delay adjustment values is created for each iteration of the first plurality of iterations; performing a second plurality of iterations with respect to a selected combination of the plurality of combinations of the initial timing delay adjustment values for the set of one or more candidate clock points, the selected combination selected based on the first plurality of iterations, the second plurality of iterations comprising testing a plurality of combinations of timing delay adjustment values of the selected combination, wherein a different combination of the timing delay adjustment values is tested for each iteration of the second plurality of iterations; and determining the desired combination based on the testing of the plurality of combinations of timing delay adjustment values of the selected combination.

In some embodiments, the method may include: identifying a plurality of clock points in the clock network; determining one or more timing violations in at least a portion of the plurality of clock points; associating a cumulative weight to each clock point based on the determined one or more timing violations; selecting a set of one or more clock points based on the cumulative weight associated to each clock point; performing a first enumeration of initial timing delay adjustment values algorithmically tested with respect to the selected set of one or more clock points; determining a combination of initial timing delay adjustment values for the selected set of one or more clock points based on the first enumeration; performing a second enumeration of timing delay adjustment values algorithmically tested in increments on the determined combination of initial timing delay adjustment values; and determining a combination of timing delay adjustment values for the selected set of one or more clock points based on the second enumeration In another aspect of the present disclosure, a system is disclosed. In some embodiments, the system may include a memory storing instructions; and a processor, coupled with the memory and to execute the instructions, the instructions configured to, when executed, cause the processor to: select a set of one or more candidate clock points from a plurality of clock points of a clock network; and determine a desired combination of timing delay adjustment values using each candidate clock point in the set of one or more candidate clock points, based on: a first plurality of iterations with respect to initial timing delay adjustment values, the first plurality of iterations comprising a creation of a plurality of combinations of the initial timing delay adjustment values for the set of one or more candidate clock points, wherein a different combination of the initial timing delay adjustment values is created for each iteration of the first plurality of iterations; a second plurality of iterations with respect to a selected combination of the plurality of combinations of the initial timing delay adjustment values for one or more of the selected candidate clock points, the selected combination selected based on the first plurality of iterations, the second plurality of iterations comprising testing a plurality of combinations of timing delay adjustment values of the selected combination, wherein a different combination of the timing delay adjustment values is tested for each iteration of the second plurality of iterations; and determine the desired combination based on the second plurality of iterations.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
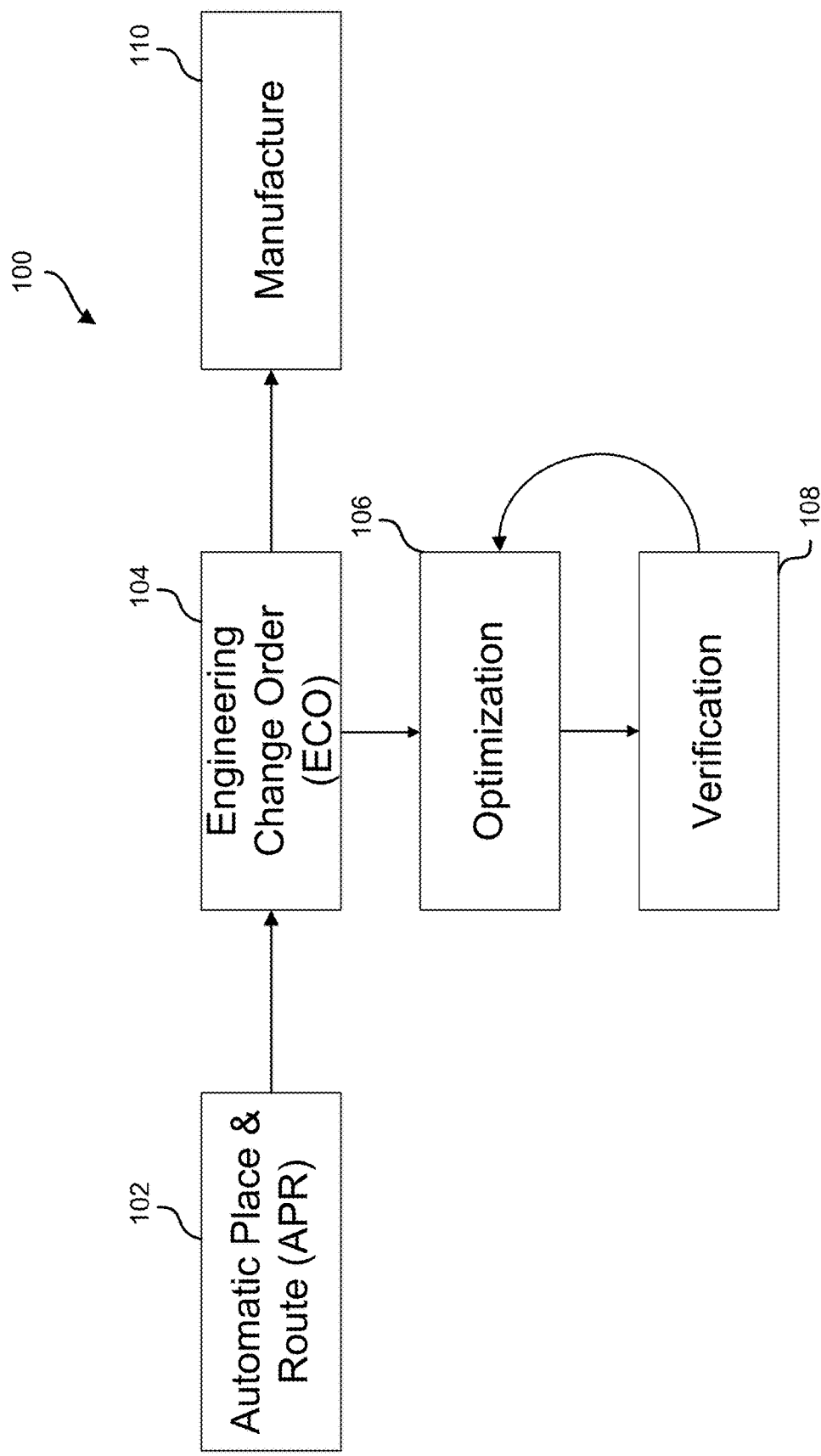
FIG. 1 is a block diagram illustrating a general IC manufacturing process involving ECO, with which embodiments described herein may be used.

Aspects of the present disclosure relate to integrated circuits (ICs) and more specifically to determining time-efficient engineering change orders (ECOs) during the manufacturing process of said ICs. For an IC design, because achieving target timing specification is crucial for tape-out (the final result of the design process before the IC is sent for manufacturing), an ECO file must be timing aware (e.g., include timing information) to fix timing errors. ECOs may create changes in the system to compensate for timing violations and clock delays (e.g., increase or decrease arrival times of signals between source clock and clock modules). However, clock networks in an IC may contain numerous clock points. For example, an IC design may contain up to a million clock points in the system.

While timing awareness for data-path ECO is manageable because it only impacts timing paths through each cell or wire, timing awareness for clock-path ECO requires much more effort because every ECO on a given clock path will change all downstream clock arrival times. In particular, the more timing violations exist downstream of a branched design, the more upstream clock points are impacted.

Hence, computational costs remain high when optimizing data paths and clock paths, considering the numerous clock points and possible combinations in the system. The complexity of clock network topologies also causes a lengthy optimization process. Existing ECO techniques may take up to a week per runtime, which significantly impacts the efficiency of the manufacturing process.

Moreover, existing ECO techniques use heuristic methods that mostly involve searching from leaf levels of clock trees (e.g., end clock points, terminals, registers, etc. of clock tree branches) to prevent runtime or memory issues. At the leaf level, a relatively small number of clock points are impacted, resulting in less time for optimizations. However, as clock violations and design flaws may happen at any level of a clock tree (e.g., top level, intermediate level), other ECO techniques cannot fully optimize the clock network.

Despite the high computational and time requirements, clock-path ECO is nonetheless among the most efficient and widely used method of optimizing clock paths. The present disclosure describes solutions that involve a selection of candidate clock points from a clock network and performing a multi-step iterative testing process where different combinations of timing delay adjustment values are tested for impact on negative slack between the candidate clock points. Through this process, a promising combination of values may be determined which has the most optimized cost, e.g., most total negative slack (TNS) reduction.

Technical advantages of the present disclosure include, but are not limited to, reduction of the length of time required to generate an ECO, while accounting for violations and flaws that exist at every level of a clock network (including at, e.g., top level, intermediate levels) rather than, e.g., mostly focusing on searching leaf levels. Further, the disclosed solutions can be implemented using computerized functions (e.g., algorithmically, real-time) to address numerous violation paths (which may reach upwards of millions) within a large clock network (e.g., having millions of clock points). Further, the iterative processes described can ensure values (e.g., timing delay adjustment values) that are optimal or close to optimal, as various combinations of values are considered in enumerative fashion, one by one, to arrive at a combination having the lowest (or close to lowest) error cost or function, resulting in high-quality IC design parameters.

In FIG. 1, a block diagram of an example IC manufacturing process 100, useful to provide context for the aforementioned solutions, is illustrated at a high level. At block 102, an automatic place and route (APR) process may take place. APR may refer to a process in which a gate-level netlist (description of the connectivity of an electronic circuit) is physically implemented in a layout and cells are auto-routed based on the connections inferred from the netlist. In some implementations, the routed design may be exported from an APR system.

At block 104, subsequent to APR, an ECO process may take place according to one or more embodiments. ECO may be implemented via, e.g., an ECO file using an ECO system, to directly patch, or modify the gate-level, post-synthesis version of an IC design. Modifications may include fixing an error that has been discovered in the IC design, applying optimization to the design, or updating the design based on a new requirement. An example of an error may be a clock transition violation. A clock transition violation may occur because a clock cell is physically too far from, e.g., a source clock as desired. During physical implementation, to fix clock transition violations, the clock or corresponding cell may be physically moved closer to the source, or vice versa. However, a post-synthesis version of a design may be patched or modified directly, e.g., using an ECO file, to avoid a costly and time-consuming process of completely re-implementing the design, which may involve logic synthesis, mapping, placing, routing, and/or timing verification, etc.

An example of the modification of the design is indicated by block 106, where an optimization process may take place. Optimization may involve adjusting clock delays to compensate for early or late arrival times of signals at modules of a clock network, e.g., by implementing an ECO file that specifies changes to the geometry of the layout of the clock network (e.g., positioning of clock points) and/or configurations of the clock points or other nodes. Such adjustments may be contained in a data structure, e.g., an ECO file, which may be generated by the ECO system. At block 108, the adjustment(s) may be verified. For example, in some embodiments, the ECO system may measure any timing errors, using static timing analysis (STA), a simulation method of computing the expected timing of a circuit. STA (e.g., using an STA system, which may be part of an ECO system) is used to check for violations and errors. Based at least on results of the STA, blocks 106 (optimization) and 108 (verification) may be repeated until a prescribed violation threshold or minimization goal is achieved.

At block 110, subsequent to optimization, manufacture and tape-out of the design may take place. For design tape-out to occur, there are verification requirements that should be met: (1) Timing should meet the design specifications in various scenarios; (2) design rules should be met with no design rule violations (often referred to as DRVs), such as foundry rules, e.g., wire must be wider than 20 nanometers; and (3) functional verification of design, which may include automatic tests based on test patterns. The present disclosure describes aspects of meeting timing requirements (e.g., efficiently identifying and reducing timing violations).

Figure 2:
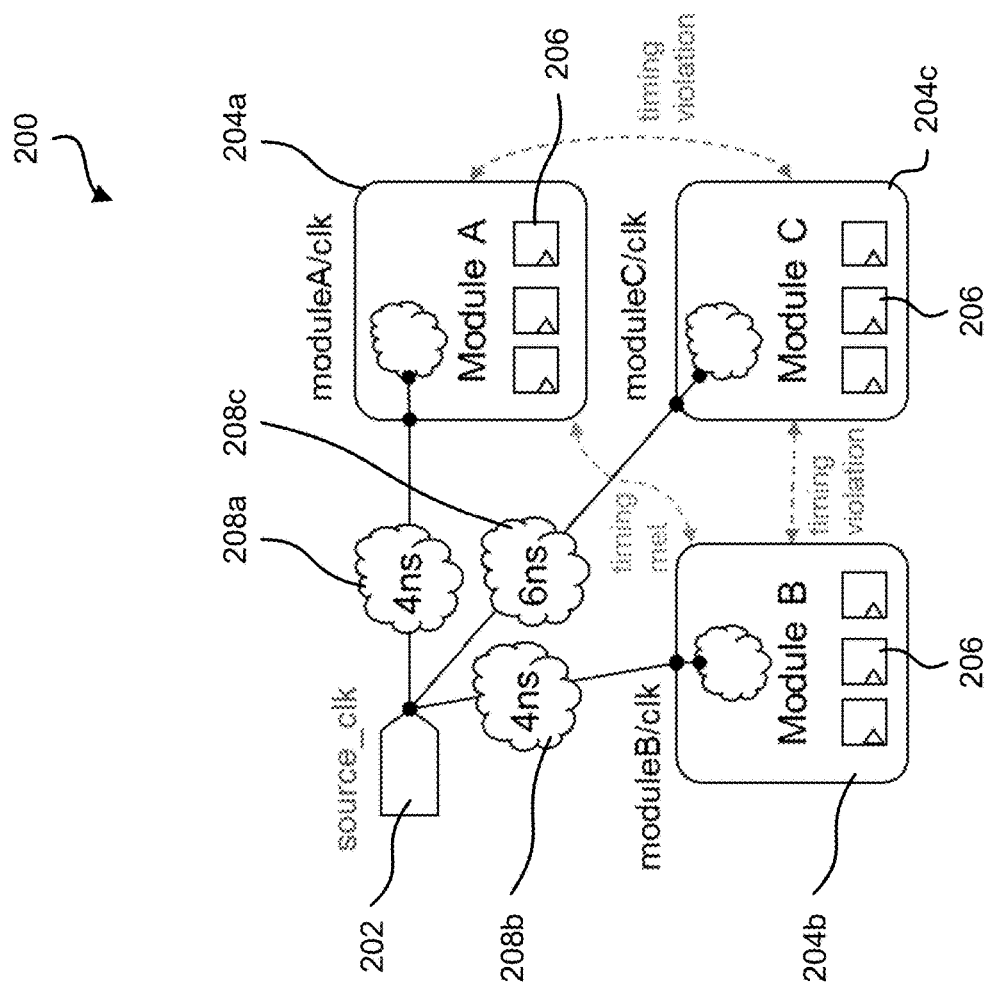
FIG. 2 is a diagram of an example design with a source clock driving three modules, useful for illustrating timing violations between modules.

To illustrate the aforementioned clock timing violations, FIG. 2 illustrates an example design 200 with a source clock 202 driving three circuit modules 204a, 204b, 204c. In some embodiments, each of the circuit modules 204a-204c may include one or more registers 206. A register 206 may be configured to receive and store information, e.g., the state of the register. For example, a single-bit registers may store within it a logic 0 or 1 value. When a clock pulse signal arrives, it may trigger the register from its clock pin and overwrite a stored value from the register's data pin, changing the state.

In some embodiments, the source clock 202 may be configured to generate clock signals to every register 206 in the clock network. In the example of FIG. 2, module A 204a and module B 204b may have a clock arrival time of 4 nanoseconds (ns), i.e., the time it takes to propagate clock signal through a series of clock cells and wires or paths 208a and 208b respectively, while module C 204c may have a clock arrival time of 6 ns through path 208c. That is, module C has a longer clock arrival time than modules A and B, which may result in setup time violations at module C (when a signal arrives too late with respect to clock, violating time required for data to be available before clock edge captures data), and hold time violations at modules A and B (when an input signal changes too soon after the clock's active transition, violating time required for data to be available after clock edge captures data). Such errors may be the result of the data path (e.g., 208c) being too slow compared to clock speeds (e.g., of modules A-C 204a-204c). If a clock arrival time is delayed, it may propagate and impact downstream clock points as well. Sufficient accumulation of violations (e.g., above a certain amount) may result in an unstable design. In some embodiments, an STA system may be used to obtain the timings of 4 ns and 6 ns. The STA system may also be configured to determine timing violations between modules A and C and between modules B and C, as well as determine that timing is met between modules A and B.

As discussed elsewhere herein, the 2-ns difference may be compensated for by ECO (via, e.g., an ECO file). For example, the arrival time of signals for modules A and B may be increased by 2 ns. As another example, the arrival time of signals for module C may be reduced by 2 ns. As another example, the arrival time for each module may be increased and reduced (e.g., by 1 ns).

It will be appreciated that various other modules (D, E, F, and so on) may exist in this circuit design, and only modules A, B, and C are shown for illustrative purposes. More directly, in some embodiments, modules A, B, and C may be selected (e.g., by an ECO system) from a myriad of clock points as candidates for optimization based on, e.g., location of modules in the clock network, hierarchy in the clock network, proximity to source clock 202, importance metrics, amount of timing violation, and other design considerations. In some embodiments, modules A, B, and C may be selected manually by a circuit designer or chip manufacturer (e.g., from a design optimization perspective or based on information regarding modules A, B, and C). An example system-registered user interface command (e.g., for the STA system or ECO system) to perform the above selection is shown below:

> set seed_list_1 {moduleA/clk moduleB/clk moduleC/clk}

Figure 3:
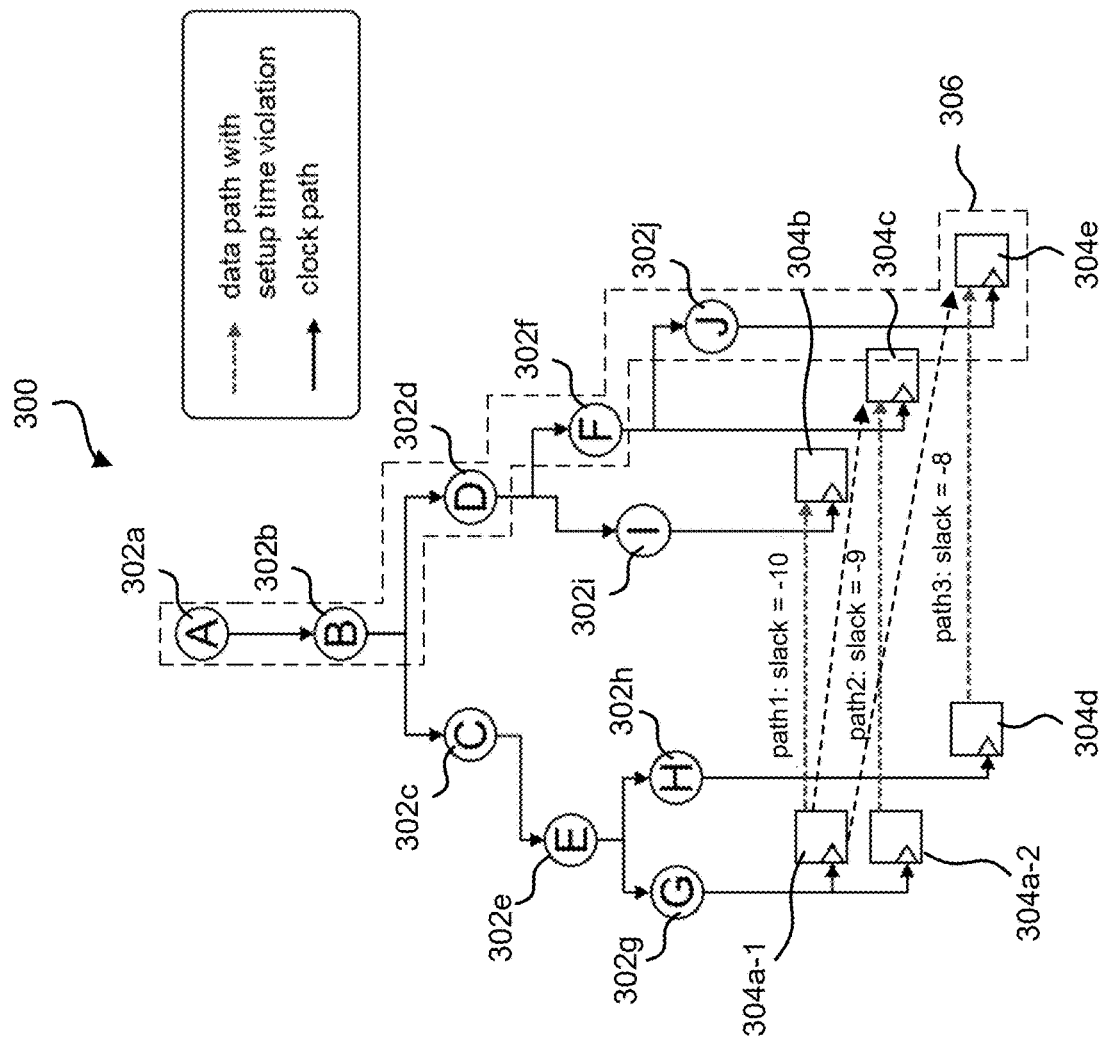
FIG. 3 is a block diagram illustrating examples of paths in which setup time violation may occur in an example clock network topology, useful for illustrating embodiments of selecting clock points and determining timing delay values.

FIG. 3 is a block diagram illustrating examples of paths in which setup time violation may occur in an example clock network topology 300. In one embodiment, various clock points (also referred to as "seeds") branch off from one another. In some implementations, clock points may be a clock source or a sink node (having, e.g., one or more registers), which may branch out from and exist along clock paths of an IC design. Some clock points are downstream of others, and there may be multiple downstream clock points, with multiple levels through the topology. For example, in the topology 300 shown in FIG. 3, various clock points 302a-302j are interconnected. It is noted again that other clock points may exist in the topology; in fact, numerous clock points and branching points may exist. However, only 10 clock points 302a-302j are shown for illustrative purposes.

Here, clock point B is downstream of clock point A. Clock points C and D are each downstream of clock point B. Clock point E is downstream of clock point C, and each of clock points G and H is downstream of clock point E. Each clock (e.g., clock point G) may be associated with or input to one or more registers, e.g., 304a-1, 304a-2. Returning to a higher-level clock point, clock points F and I are downstream of clock point D. Clock point J is downstream of clock point F.

As can be seen, a clock network may include clock points that branch into many leaf-level "endpoints" (e.g., clock points G, H, I, J), where timing violations may accumulate down a set of clock paths 306, e.g., from clock point A to clock point J, with intermediate clock points B, D, and F.

As examples of timing violations, an STA report from an ECO system may determine one or more violation paths 1, 2, and 3 (indicated by dotted arrows between registers). The STA report may indicate, for instance, that a first setup timing violation may exist in the data path (register-to-register path) between register 304a-1 register 304b with a negative slack of 10 ns. "Slack" is understood to refer to additional time margin within which a valid operation, e.g., setup time operation to propagate a signal from one register to another register within a predefined clock period, may occur. For example, slack may refer to the margin by which a timing requirement is met or not met, e.g., the difference between required time and arrival time. The techniques disclosed herein endeavor to reduce negative slack. Here, the timing path 1 has a setup time slack of −10 ns (negative slack of 10 ns). The clock points in the capture path include A, B, D, and I. Here, clock points D and I do not exist in the launch path, the portion of the clock path responsible for launching the data (clock points A and B). Therefore, clock point D and clock point I may each be accorded a weight value of 10 because adding timing delay over either D or I can reduce the negative setup slack. In another embodiment, the weight value is a weight factor corresponding to the relative slack.

A second setup timing violation path from register 304a-2 to register 304c may have a negative slack of 9 ns. Therefore, clock point D and clock point F may each be accorded a weight value of 9. A third setup timing violation path from register 304d to register 304e may have a negative slack of 8 ns. Therefore, clock points D, F and J may each be accorded a weight value of 8. The weight values are cumulative for the captured path. Clock point D, for instance, would have accumulated the most slack and assigned a weight value of 27 (=10+9+8), representing the compounded impact on the clock paths. The resulting weight values for each clock point may be output, organized, and stored in any suitable format, though they are summarized as shown in Table 1 below.

TABLE 1

Weight values of each clock point shown in FIG. 3.

| clock point | A | B | C | D | E | F | G | H | I | J |
|---|---|---|---|---|---|---|---|---|---|---|
| weight | 0 | 0 | 0 | 27 | 0 | 17 | 0 | 0 | 10 | 8 |

In some embodiments, the highest three values may be selected from the resulting weight values. In this case, the highest three values are 27, 17, and 10, corresponding to clock points D, F, and I, respectively. Hence, clock points D, F, and I are determined to be candidate clock points or candidate "seeds." It is noted that, in some scenarios, additional setup timing violation paths may exist from register 304a-1 to multiple ones of registers 304b, 304c and 306 (indicated by dotted arrows for illustration), and/or similarly from register 304a-2 to multiple ones of registers 304b, 304c and 306, and/or from register 304d to multiple ones of registers 304b, 304c and 306.

An example function to accomplish the above process of determining the candidate clock points is shown below as pseudocode:

```
1 Procedure Create_Clock_Seeds_For_Setup_Violation {opt1 opt2} {
2     for each setup timing violation path {
3         for each clock points in capture path {
4             if clock points A does not exist in launch path {
5                 weight[A] += –path's negative slack
6             }
7         }
8     }
9     return top 3 weighted clock points
10 }
```

An example system-registered user interface command (e.g., for the STA system or ECO system) to perform the above process using the above function is shown below:
> set seed_list_2 [Create_Clock_Seeds_For_Setup_Violation]

In some embodiments, the selection of candidate clock points may include the top two, four, or any suitable number of clock points, instead of the top three as shown in the illustrative example above. In some embodiments, the selection may include manually selected clock points. In some implementations thereof, the manual selection may be in addition to the function selected candidate clock points. In some implementations, the manual selection may overlap at least in part with the function selected candidate clock points. In some embodiments, the selection of candidate clock points may not be the clock points having the highest weights, but account for one or more other factors, such as the designer's perspective, number of registers associated with a clock point, the hierarchical level of the clock point, etc. Thus, a variety of ways to generate a list of candidate seeds may be used individually or in conjunction with one another.

In some implementations, one or more operational parameters or options (e.g., opt1 and/or opt2 as shown above) may be provided as optional input variables to the example function. These optional parameters may allow the process associated with the function to be modified or customized with respect to certain operational aspects. One example of such a parameter may relate to runtime duration of the function. Runtime duration may refer to the duration of operating the function, e.g., that represented by the above pseudocode to determine the candidate clock points. The specified runtime duration may be longer or shorter, e.g., than an initial or default duration or a previously set duration. Another example of the parameter may relate to quality of the selected candidate clock points or seeds. The quality of the selected candidate clock points may be determined, e.g., with respect to how large the weight values are (so that clock points having more impact on the clock network can be analyzed) or the one or more other factors above. As an example, a higher-quality clock point may account for the impact of the clock point, e.g., based on slack, hierarchy, or desired outcomes with the network topology 300. Another example of the parameter may relate to a quantity of clock points analyzed, e.g., an upper bound that limits the amount of analyzed violation paths. The limit may be, for instance, the top worst n number (e.g., thousands) of violation paths, where n is a positive integer.

In some example operations of the clock network, runtime duration and the quality (e.g., of the selected candidate clock points may compete as tradeoffs. Increasing the runtime duration may be undesirable from the perspective of time-efficiency. However, in some cases, spending more time may be a worthwhile tradeoff to acquire higher-quality candidate clock points. On the other hand, acquiring candidate clock points more quickly may be prioritized in some situations (e.g., when there are too many violation paths in a design, e.g., 10 million) by defining the runtime duration to be reduced, e.g., compared to an initial or previous duration. However, the resulting quality of the candidate clock points may be lower.

In some embodiments, lists of candidate clock points may be appended together. For example, the user-configured list seed_list_1 may be combined with the list created by timing report analysis (e.g., STA report) seed_list_2 to form a final list. An example system-registered user interface command (e.g., for the STA system or ECO system) to perform this process is shown below:
> set seed_list [concat $seed_list_1 $seed_list_2]

Note that each of the techniques described with respect to FIGS. 2 and 3 accomplishes the same step of determining a selection of candidate clock points to act as "seeds" for clock ECO. By collecting a limited list of candidates, ECO may optimize a limited number of clock points identified in a clock network, thereby advantageously reducing the runtime required to identify timing violations and errors.

More specifically, the timing delay value to be increased or decreased for each of the candidate clock points may be determined. In some embodiments, an enumeration approach is taken. "Enumeration" in this context may be understood to refer to identifying and evaluating (e.g., testing) specific values, e.g., for impact on the clock network. Identifying values for enumeration may involve, e.g., determining various combinations of values, or iterating through increments, decrements, or intervals. Given the limited number of identified clock points (now highly reduced from the number of clock points in the entire topology), iterating through various combinations of timing delay values may become more cost- and time-efficient, as well as impactful to multiple levels of the clock network, as compared to computationally expensive existing methods that focus on the leaf level where relatively fewer clock points are impact.

In some embodiments, the enumeration may include an initialization of a plurality of timing delay adjustment values, e.g., 0 picoseconds (ps), +100 ps, and −100 ps. Timing delay adjustment may refer to a change in, e.g., the arrival time of signals from a source clock to a particular clock point, so as to improve slack of timing paths related to this particular clock point. Hence, timing delay adjustment values may refer to the value to effect the change (e.g., implement via ECO operations described below, e.g., changes to cells and/or wires) The number of initial delay adjustment values (in this case, three) is taken to the power of the quantity of the candidate clock points (K), which may be expressed as $3^K$. For example, take two clock points D and F from the example of FIG. 3 as candidate clock points. There would be nine ($3^2$) combinations of initial delay adjustments may be created for these two candidate clock points. Table 2 below summarizes the combinations of initial delay adjustment values.

TABLE 2

Combinations of initial delay adjustment values for two candidate clock points.

| Combination | D | F |
|---|---|---|
| #1 | 0 | 0 |
| #2 | 0 | +100 |
| #3 | 0 | −100 |
| #4 | +100 | 0 |
| #5 | +100 | +100 |
| #6 | +100 | −100 |
| #7 | −100 | 0 |
| #8 | −100 | +100 |
| #9 | −100 | −100 |

Referring to the example of combinations in Table 2, these nine combinations may be tested for slack reduction, and delay adjustment values for individual candidate clock points with initial values of 0 ps may be further tested, via enumeration of values.

As an illustrative example, in the first enumeration, it may be found that the fourth combination (clock point D recorded with a delay adjustment of +100 ps and clock point F recorded with a delay adjustment of 0 ps) has the most negative slack reduction out of the nine combinations. In the second enumeration, clock point F may be tested with delay adjustments of 0 ps, +90 ps, and −90 ps. Here, it may be found that +90 ps results in the most negative slack reduction out of the three combinations. Therefore, in this example, the timing value may be increased by +100 ps for clock point D and +90 ps for clock point F, e.g., via an ECO file. In some embodiments, if 0 ps is still found with the most negative slack reduction on clock point F among 0 ps, +90 ps, and −90 ps, then the iteration may continue on testing the delay adjustments over clock point F in increments of −10 ps until they reach 0 ps, +0 ps, −0 ps for every clock point (clock point F in this case) not yet associated with non-zero delay adjustment values. In some embodiments, if 0 ps is found with the most negative slack reduction, the process may stop with no further iterations.

In other embodiments, other combinations of initial delay adjustment values may be used. For example, two initial values may be used (e.g., 0 ps, +100 ps). In that case, there would be $2^K$ initial combinations for K candidate clock points (where K is a positive integer). In some embodiments, the timing delay adjustment values may be different (e.g., 0 ps, +50 ps, −50 ps). In some embodiments, the range of values to iterate through may be wider (+1000 ps to −700 ps) or narrower (e.g., +50 ps to −50 ps). In some embodiments, enumeration may occur at different increments (e.g., −5 ps, −20 ps, −100 ps). In some embodiments, enumeration may be performed for more than one candidate clock point, e.g., if there are more than two candidate clock points and the selected combination of initial delay adjustment values (from the first enumeration) contains more than one 0 values.

According to one embodiment, the ECO file may include the target delay adjustment values obtained for the specified clock points. A series of ECO operations may then be performed to achieve these target values, including (1) addition or removal of a cell (group of transistor and interconnect structures configured to provide logic or storage in integrated circuits), (2) addition, connection, or disconnection of a wire, and/or (3) replacement of a cell instance with different cell type.

An example function to accomplish the above process is shown below as pseudocode:

```
1   Procedure Enumeration_on_Delay_Values_for_K_Seeds {
2       for (t = 100; t > 0; t−= 10) {
3           three delay adjustment value options = (0 ps, +t ps, −t ps)
4           create 3^K combinations of target delay adjustment on K seeds
5           for each created combination {
6               timing what-if with delay adjustment on seed
7           }
8           pick the combination with most total negative slack improve
            {
9           for each seed {
10              if seed A's delay adjusted value == +t ps {
11                  record target delay adjustment on A = +t ps
12                  remove A from seed list in next loop
12              }
13              if seed A's delay adjusted value == −t ps {
14                  record target delay adjustment on A = −t ps
15                  remove A from seed list in next loop
15              }
16          }
17      }
18  }
19  return recorded target delay adjustment values of all seeds
20  }
```

In the above example process, line 3 specifies initial delay adjustment values of 0 ps, +100 ps, and −100 ps. Line 4 creates $3^K$ combinations of initial delay adjustment values for K candidate clock points. Lines 5, 6 and 8 determine the combination with the highest slack improvement (the fourth combination in Table 2 in the illustrative example described above). According to lines 11 and 15, for initial delay adjustment values that have been set (e.g., to +100 or −100 ps), the corresponding clock point is removed from testing of delay adjustment values in increments of −10 ps. Hence, the clock point having an initial delay adjustment value of 0 ps (clock point F in the illustrative example described above) is further enumerated in said increments of −10 ps or +10 ps (e.g., 0 ps, +90 ps, and −90 ps in the next loop). Line 19 records the resulting "best" combination of delay adjustment values for all candidate clock points (+100 ps for clock point D and +90 ps for clock point F in the illustrative example). In one sense, a cost function or error for delay adjustment values is being reduced or minimized at least in part through the iteration and looping so as to, e.g., reduce the total negative timing slack. In some implementations, other optimizations such as area reduction or power reduction may be achieved this way through clock ECO.

In some embodiments, another optimization process may be utilized alternatively or additionally to the enumerative approach. For example, a machine learning process may be used on one or more selected combinations of initial delay adjustment values to minimize the cost function (or loss function) correlated to delay adjustment values. In some implementations, a cost optimization process such as gradient descent may be used to minimize the error related to the cost function. In linear regression, the cost function may fit a regression line that measures the difference between the actual value of the output of the cost function and the estimated or predicted value of the output. Gradient descent may involve "steps" wherein the changes are made to one or more variables or parameters (e.g., one or more initial delay adjustment values, weight, bias) of the cost function in each step, where, in each step, the error for the cost function (e.g., mean squared error) is derived. In gradient descent, a learning rate may also be set and/or adjusted to determine how large each step is. This type of approach may be more suitable for clock networks having more than a threshold number of clock points (e.g., over 1 million), where a sufficiently numerous quantity of clock points could be prohibitively computationally expensive if done in an enumerative (one-by-one) fashion.

Figure 4:
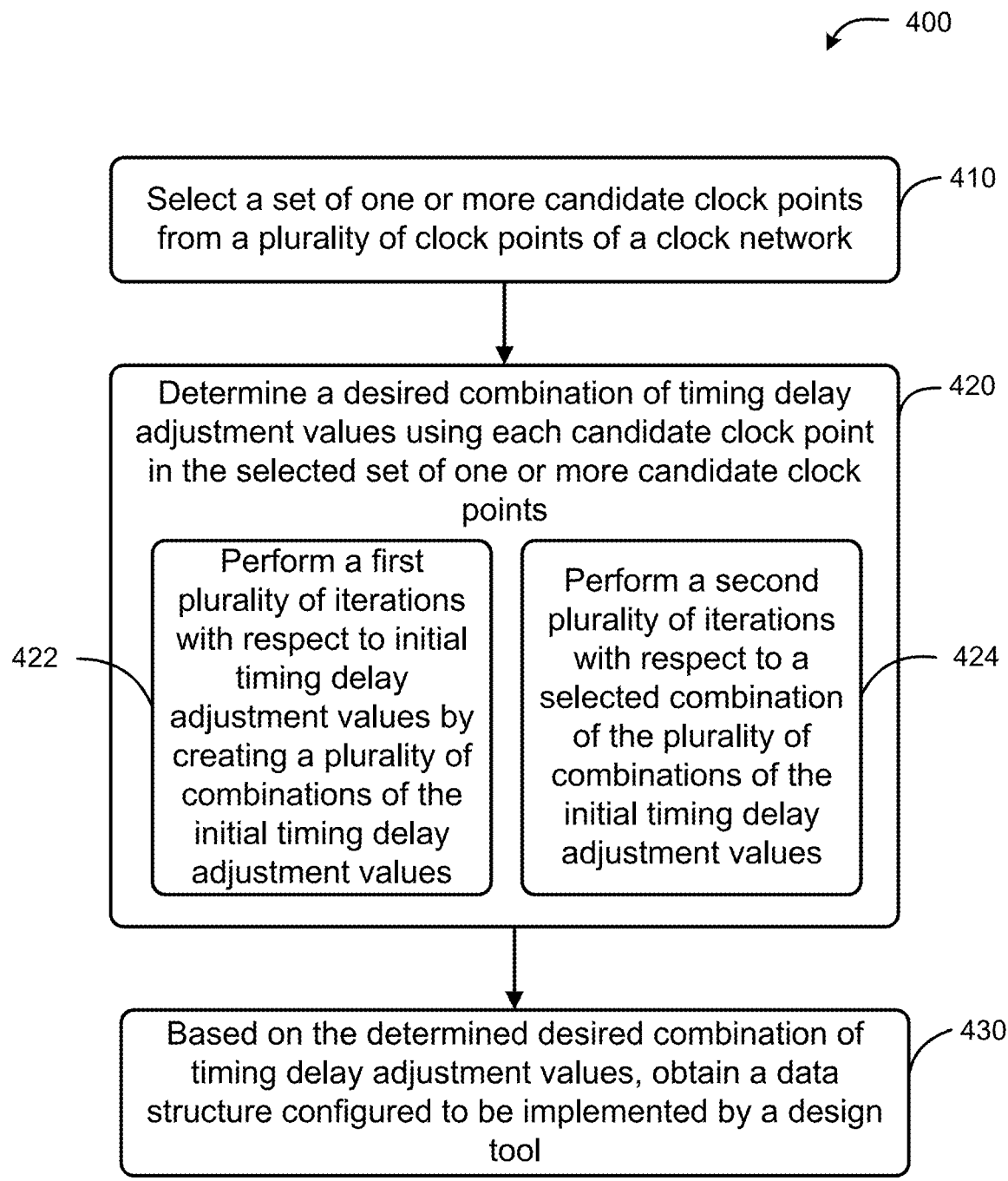
FIG. 4 is a flow diagram illustrating a method for efficiently obtaining timing delay adjustment values for clock points in a clock network, according to some embodiments.
Figure 8:
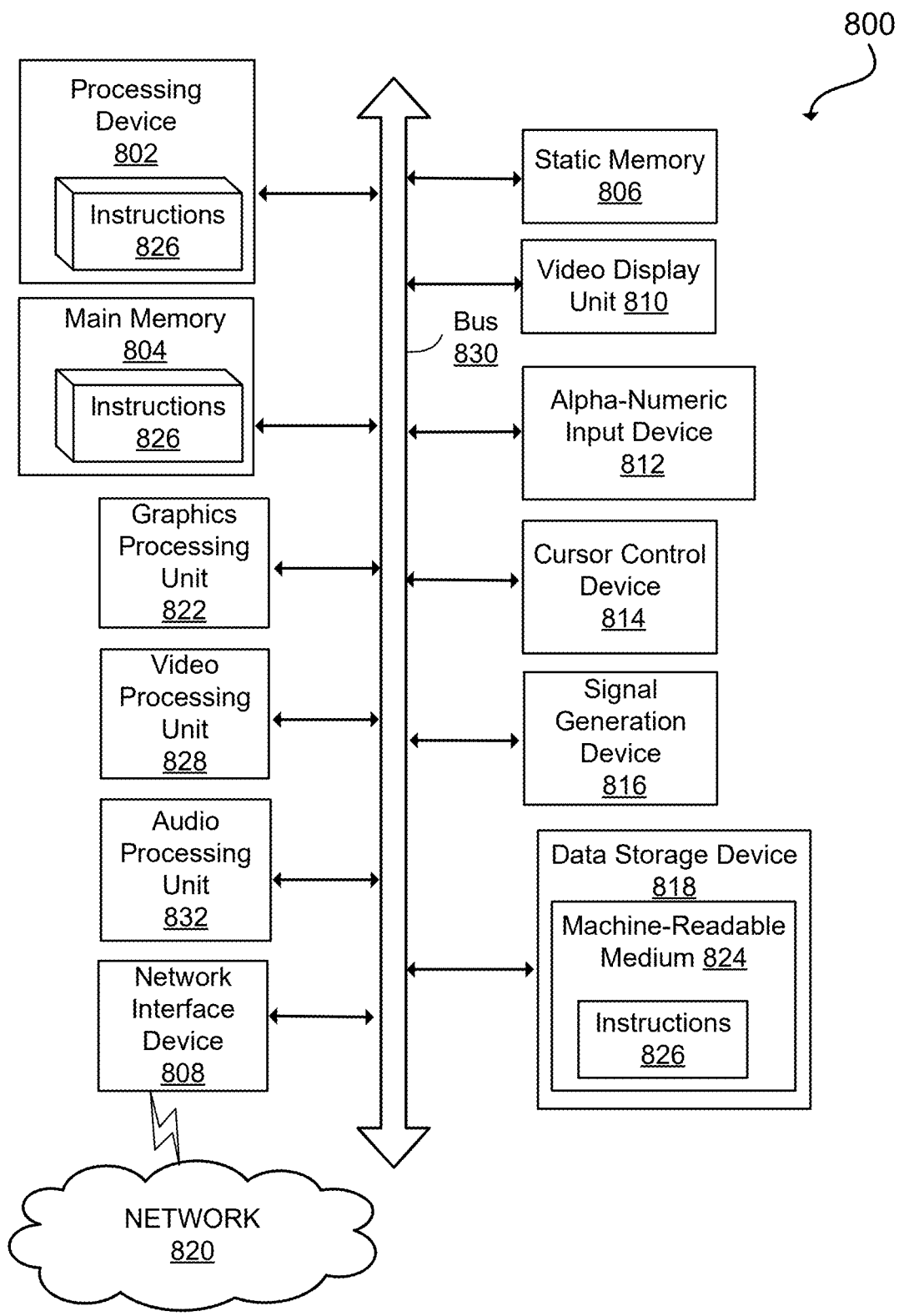
FIG. 8 depicts an example diagram of an example computer system in which embodiments of the present disclosure may operate.

FIG. 4 is a flow diagram illustrating a method 400 for efficiently obtaining timing delay adjustment values for clock points in a clock network, according to some embodiments. One or more of the functions of the method 400 may be performed by a computerized apparatus or system. Means for performing the functionality illustrated in one or more of the steps shown in FIG. 4 may include hardware and/or software components of such computerized apparatus or system, such as, for example, a device, a computer system, or a computer-readable apparatus including a storage medium storing computer-readable and/or computer-executable instructions that are configured to, when executed by a processor apparatus, cause the at least one processor apparatus or another apparatus to perform the operations. Example components of a computerized apparatus or system are illustrated in FIG. 8, which are described in more detail below. A design system or tool such as an ECO system may be an example of the computerized apparatus or system.

It should also be noted that the operations of the method 400 may be performed in any suitable order, not necessarily the order depicted in FIG. 4. Further, the method 400 may include additional or fewer operations than those depicted in FIG. 4 to obtain the timing adjustment values.

At 410, the method 400 may include selecting a set of one or more candidate clock points from a plurality of clock points of a clock network. For example, three clock points may be selected based on one or more criteria. In another example, ten clock points may be selected based on one or more criteria. Any number of candidate clock points out of the plurality of clock points may be identified depending on the scenario, length of optimization desired, and/or computational resources available. In some embodiments, a function (such as Create_Clock_Seeds_For_Setup_Violation shown above) may be operated to determine the candidate clock points. In some embodiments, the set of one or more candidate clock points may be selected from at least a hierarchical level other than a leaf level of the clock network, e.g., higher-level clock points D and/or F in FIG. 3.

In some embodiments, the candidate clock points may be selected based on weights assigned to clock points. The weights may be determined based on a cumulation of clock timing violations (e.g., setup time violations between clock points as discussed with respect to FIG. 3). In some embodiments, the weights may be determined using an automated system, such as an STA system or an ECO system, and stored in or accessible via, e.g., an STA report. In some implementations, the clock points having the highest weights may be selected, e.g., clock points corresponding to the top three weights.

In some embodiments, the candidate clock points may be selected based on signal arrival times between a clock point and a source clock. In some implementations, a disparity between the arrival times may be considered, e.g., a disparity of 50% or more between arrival times of two or more clock points may indicate that an adjustment of timing delays to these clock points will be an efficient use of processing resources. For example, if a first clock point has a 50% larger clock arrival time (e.g., 6 ns) compared to that of a second clock point (e.g., 4 ns), these two clock points may be added to the candidate list, similar to the example discussed with respect to FIG. 2.

In some embodiments, the candidate clock points may be collected based on a physical location on the chip. For example, for clock points nearby specific locations (e.g., within a threshold distance) of the chip could be added to the candidate list.

In some embodiments, the candidate clock points may be collected based on its name. For example, APR systems may have a specific naming keyword to the clock tree synthesis cells for a specific purpose (load splitting, local delay insertion, etc.). Then, a keyword for local delay insertion clock points may be used to collect candidate clock points.

In some embodiments, the candidate clock points may be selected based on a circuit designer's knowledge or intent. For example, a human designer may be privy of cells and clock points that are significant to the clock network design. In some implementations, an ECO system may identify significant clock points, such as a clock point that branches into relatively numerous downstream clock points; e.g., this clock point may branch off into more than a predetermined quantity of branches, or more than a relative difference in the quantity of branches as compared to other clock points.

In other embodiments, other factors may contribute to the selection of the candidate clock points, such as number of registers associated with a clock point, the hierarchical level of the clock point, etc. In some scenarios, the selecting of the set of one or more candidate clock points may be based on one or more operational parameters. One or more operational parameters may be specified and provided as input to the algorithmic function (e.g., opt1 and/or opt2 as shown above) to modify the operation of the selection of the one or more candidate clock points. For example, a specified runtime duration may be set that is longer than shorter than a default duration. The above bases of selecting the candidate clock points may be considered individually or in conjunction with one another.

At 420, the method 400 may include determining (e.g., using a processing device) a desired combination of timing delay adjustment values for respective ones of the selected candidate clock points. The determination of the desired combination of timing delay adjustment values may be based on a multi-step enumeration of timing delay adjustment values using each candidate clock point in the set of one or more candidate clock points, as discussed with respect to the example of Table 2.

More specifically, in some embodiments, in a first enumeration stage, a first plurality of iterations may be performed with respect to initial timing delay adjustment values, at 422. The first plurality of iterations may involve creating combinations of the initial timing delay adjustment values associated with the set of one or more candidate clock points, wherein, a different combination of the initial timing delay adjustment values is created for each iteration of the first plurality of iterations. An enumeration approach may be taken with initial timing delay adjustment values set for candidate clock points, where each of various combinations of initial values may be identified and tested one by one for impact on negative slack between candidate clock points. For example, for three initial values (e.g., 0 ps, +100 ps, −100 ps), $3^K$ combinations of initial value sets may be created for K number of candidate clock points, although with more or fewer initial values, this number may increase or decrease ($2^K$, $4^K$, etc.). In some embodiments, one combination of initial values may be determined (e.g., by an STA system or ECO system) to result in the highest negative slack reduction for the candidate clock points out of the $3^K$ combinations, thus being the most promising combination of timing delay adjustment values. In some embodiments, one combination of initial values may be determined to result in the most optimized cost, e.g., most total negative slack (TNS) reduction, thus being the most promising combination.

In some embodiments, in a second enumeration stage, a second plurality of iterations may be performed with respect to a selected combination (e.g., one combination of initial values resulting from 422) of the plurality of combinations of the initial timing delay adjustment values for the set of one or more of the selected candidate clock points, the selected combination selected based on the first plurality of iterations, at 424. The second plurality of iterations may include testing a plurality of combinations of timing delay adjustment values of the selected combination, wherein a different combination of the timing delay adjustment values is tested for each iteration of the second plurality of iterations. The selected combination may be the most promising combination of initial timing delay adjustment values isolated from the first enumeration stage, and various combinations of values may then be tested in incremental or iterative fashion, e.g., changing the timing delay adjustment values by an increment (e.g., −10 ps). For example, one of the initial timing delay adjustment value (out of three, for example) in the determined combination of initial values may be adjusted in increments, e.g., from +100 ps to +90 ps. The adjustment may loop and iterate until 0 ps. Based on the second enumeration stage, a combination of timing delay adjustment values may be determined (e.g., by an STA system or ECO system) to result in the highest slack reduction for the candidate clock points out of the iterated combinations from the first and second pluralities of iterations at 422 and 424, thus being the desired combination of timing delay adjustment values most effective at reducing slack.

Although the foregoing steps may not capture the absolute maximum reduction of slack, given that to do so would require testing of each clock point of the clock network topology, limiting the testing to relatively few identified clock points and allowing violations at clock points to be adjusted and improved not just at the leaf level but all affected levels of the hierarchy (based on, e.g., weights in 410) advantageously enables a time- and resource-efficient way to perform the adjustments, e.g., via ECO.

At 430, a data structure may be obtained based at least on the determined desired combination of timing delay adjustment values, the data structure being configured to be implemented by a design system or tool. In some embodiments, the determined values for the identified clock points may be stored in an existing ECO file configured to be implemented by the design system, e.g., an ECO system. In some embodiments, an ECO file containing the determined values for the identified clock points may be generated. Such a data structure may be stored for access by the design system or transmitted to the design system. The design system may perform one or more operations (e.g., ECO operations), such as (1) addition or removal of a cell, (2) addition, connection, or disconnection of a wire, and/or (3) replacement of a cell instance with different cell type in the clock network design.

According to different implementations, different increments may be used, different initial timing delay adjustment values may be used, range of timing delay adjustment values may be wider or narrower, enumeration may be performed for more than one candidate clock point, and other suitable variations may be made to initial and enumerative parameters.

Figure 5:
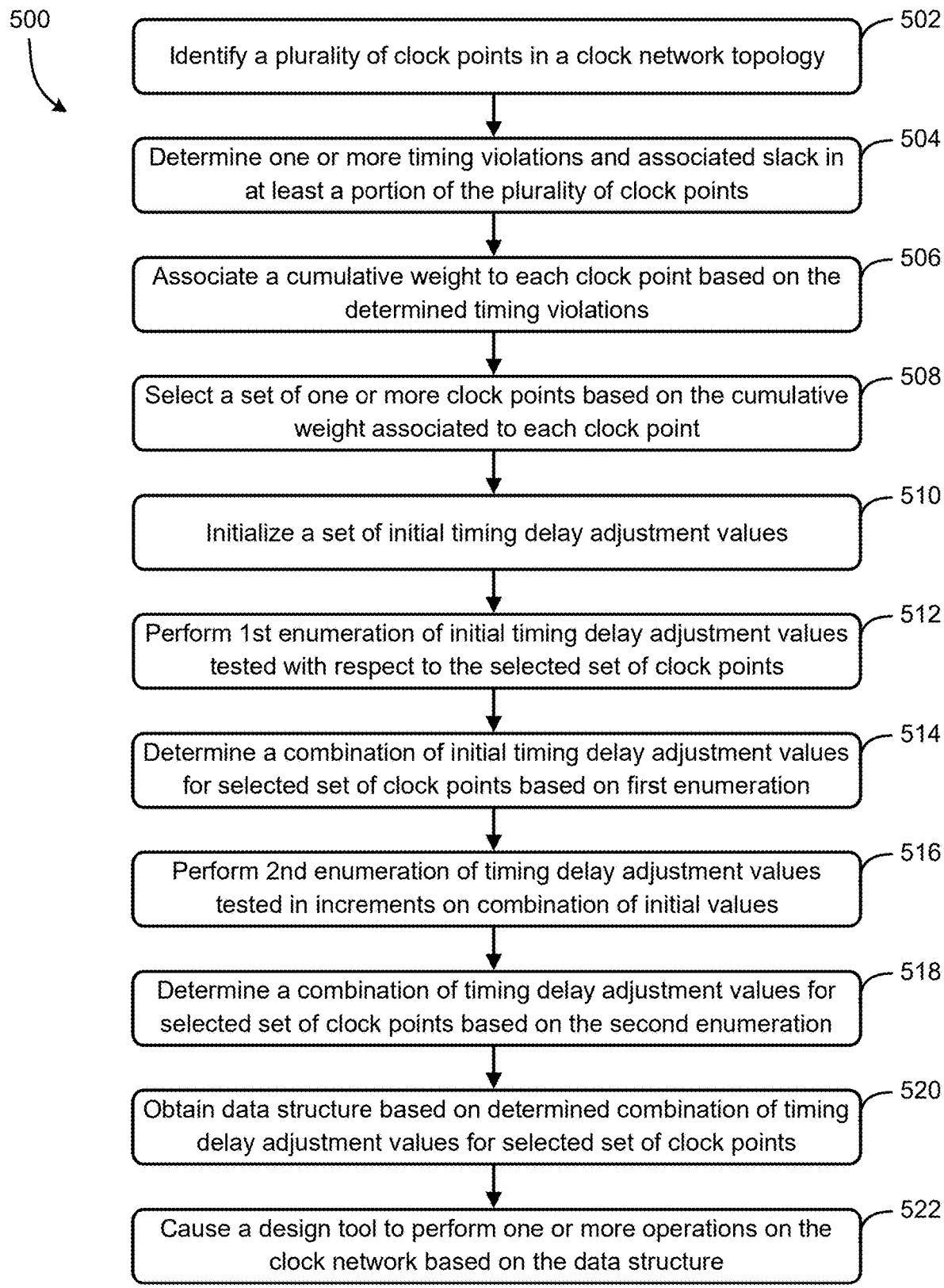
FIG. 5 is a flow diagram illustrating another method for efficiently obtaining timing delay adjustment values for clock points in a clock network, according to some embodiments.

FIG. 5 is a flow diagram illustrating another method 500 for efficiently obtaining timing delay adjustment values for clock points in a clock network, according to some embodiments. One or more of the functions of the method 500 may be performed by a computerized apparatus or system. Means for performing the functionality illustrated in one or more of the steps shown in FIG. 5 may include hardware and/or software components of such computerized apparatus or system, such as, for example, a device, a computer system, or a computer-readable apparatus including a storage medium storing computer-readable and/or computer-executable instructions that are configured to, when executed by a processor apparatus, cause the at least one processor apparatus or another apparatus to perform the operations. Example components of a computerized apparatus or system are illustrated in FIG. 8, which are described in more detail below. A design system such as an ECO system may be an example of the computerized apparatus or system.

It should also be noted that the operations of the method 500 may be performed in any suitable order, not necessarily the order depicted in FIG. 5. Further, the method 500 may include additional or fewer operations than those depicted in FIG. 5 to obtain the timing adjustment values.

At 502, the method 500 may include identifying a plurality of clock points in a clock network topology. Clock points 302*a*-302*j* may be examples of the plurality of clock points in the clock network topology 300.

At 504, the method 500 may include determining one or more timing violations and associated slack in at least a portion of the plurality of clock points. Setup time violations on paths 1, 2, and 3 shown in FIG. 3 may be examples of the one or more violations. Slack measured (e.g., based on an STA report) among registers of clock points G, H, I, F, J (and D by association) illustrated in FIG. 3 may be examples of the associated slack.

At 506, the method 500 may include associating a cumulative weight to each clock point of the plurality of clock points based on the determined timing violations. Some clock points may be affected more by the clock violations, which may result in higher weight values for some clock points, lower weight values for some clock points, and no weight assigned to some clock points. See, e.g., Table 1.

At 508, the method 500 may include selecting a set of one or more clock points (a "seed list") based on the cumulative weight associated to each clock point. In some embodiments, the set of clock points may be based on the highest three weight values, although other additional and/or alternative clock points may be selected based on other factors discussed elsewhere herein.

At 510, the method 500 may include initializing a set of initial timing delay adjustment values. For example, there may be three initial values, e.g., 0 ps, +100 ps, and −100 ps.

At 512, the method 500 may include performing a first enumeration of initial timing delay adjustment values algorithmically tested with respect to the selected set of one or more clock points. For example, the enumeration may result in $3^K$ combinations of initial values based on the three initial values (e.g., based on 510) and K number of selected clock points (e.g., where K=3 based on 508). The first enumeration may be generalized to resulting in $N^K$ combinations of the initial timing delay adjustment values, where the selected set of one or more clock points includes K clock points, and the initialized set of initial timing delay adjustment values includes N initial timing delay adjustment values, where N and K are positive integers.

At 514, the method 500 may include determining a combination of initial timing delay adjustment values for the selected set of one or more clock points based on the first enumeration. The combination of initial timing delay adjustment values may be chosen because it resulted in a determination (e.g., by an STA system or ECO system) of the most slack improvement out of the $3^K$ combinations of initial values.

At 516, the method 500 may include performing a second enumeration of timing delay adjustment values algorithmically tested in increments on the determined combination of initial timing delay adjustment values. For example, one of the initial timing delay adjustment value in the determined combination may be adjusted in increments from a first end of a range of timing delay adjustment values to a second end, e.g., increments of −10 ps from +100 to +90 to +80 and so on until −100 ps.

At 518, the method 500 may include determining a combination of timing delay adjustment values for the selected set of one or more clock points based on the second enumeration. The combination of timing delay adjustment values may be chosen because it resulted in a determination (e.g., by an STA system or ECO system) of the most slack improvement out of the iterative tests.

At 520, the method 500 may include obtaining a data structure based on the determined combination of timing delay adjustment values for the selected set of one or more clock points. In some embodiments, the data structure may be an ECO file (usable by a design system, e.g., ECO system) containing the determined timing delay adjustment values. In some implementations, the ECO file may be generated based on the values. In some implementations, the values may be added to an existing ECO file.

At 522, the method 500 may include causing a design system to perform one or more operations on the clock network based on the data structure. In some embodiments, the design system may include an ECO system. In some cases, an STA system may be used as well. The ECO system may perform the one or more operations for optimization of the clock network of an IC. For instance, the ECO system may (1) add or remove a cell in the clock network, (2) add, connect, or disconnect a wire in the clock network, (3) replace a cell instance with different cell type in the clock network design, and/or (4) commission one or more of the above operations to another design system or tool. As an example, a new ECO buffer cell may be created and inserted in front of a target clock point. In some embodiments, the performance of the operations may be performed in part, e.g., replace only a portion of the cell instances, so that the clock network may be retested with the foregoing steps for more granular changes to the clock network. As an example, if the resulting estimated delay is excessive, the new ECO buffer may be replaced with another cell type to become faster. As another example, if the resulting delay is too little, the new ECO buffer could be replaced with another cell type to become slower, or, another new ECO buffer could be further created and inserted until the target delay adjustment is achieved. In some embodiments, the operations may be scheduled.

Figure 6:
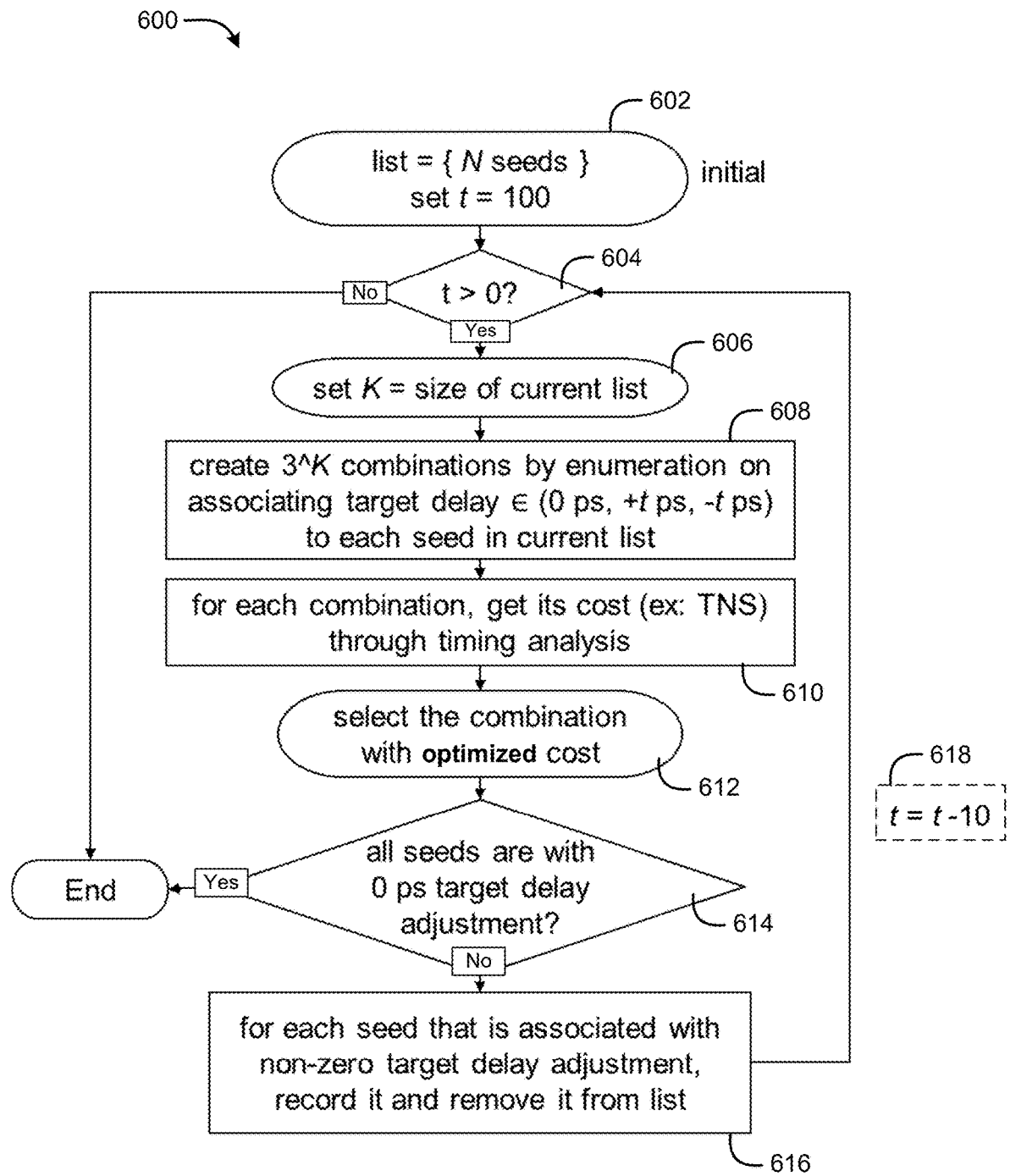
FIG. 6 is a flow diagram illustrating another method for efficiently obtaining timing delay adjustment values for clock points in a clock network, according to some embodiments.

FIG. 6 is a flow diagram illustrating another method 600 for efficiently obtaining timing delay adjustment values for clock points in a clock network, according to some embodiments. One or more of the functions of the method 600 may be performed by a computerized apparatus or system. Means for performing the functionality illustrated in one or more of the steps shown in FIG. 6 may include hardware and/or software components of such computerized apparatus or system, such as, for example, a device, a computer system, or a computer-readable apparatus including a storage medium storing computer-readable and/or computer-executable instructions that are configured to, when executed by a processor apparatus, cause the at least one processor apparatus or another apparatus to perform the operations. Example components of a computerized apparatus or system are illustrated in FIG. 8, which are described in more detail below. A design system such as an ECO system may be an example of the computerized apparatus or system.

It should also be noted that the operations of the method 600 may be performed in any suitable order, not necessarily the order depicted in FIG. 6. Further, the method 600 may include additional or fewer operations than those depicted in FIG. 6 to obtain the timing adjustment values.

At 602, the method 600 may include initializing values for a list of one or more clock points (or "seeds") in a clock network. In some embodiments, the values initialized may include a number of clock points (e.g., N number of seeds) and an initial delay adjustment value (e.g., t=100 picoseconds (ps)). That is, in one example, the process for obtaining timing delay adjustment values may start with 100 ps of delay adjustment for N seeds. In some implementations, N may be the total number of clock points in the clock network. In some implementations, N may be a portion of the clock points in the clock network.

At 604, the method 600 may include determining whether the initial delay adjustment value (t) for a given clock point from the list of seeds has a value greater than 0. In the initial state, since t=100, it will be the case that an initial delay adjustment value for a given clock point is greater than 0. In such a case, the method may proceed to step 606. If not, for example, the method has already performed multiple iterative loops in the steps that follow, or if all the delay adjustment values are 0 (e.g., a combination of 0 ps and 0 ps for two candidate clock points), the method may terminate.

At 606, the method 600 may include setting a size of a current list of candidate clock points. In some embodiments, K number of candidate clock points may be selected from the list of clock points (N seeds initialized from 602). K may be determined from one of several ways. For example, one or more candidate clock points may be selected based on one or more criteria, weights, etc. as described with respect to 410 above. In some cases, K=N, if, for example, the initialized number of clock points already corresponds to the selected the clock points on which to perform iterative enumeration using the steps below.

At 608, the method 600 may include creating $3^K$ number of combinations by enumeration by setting delay adjustment values to combinations of 0 ps, +t ps, and −t ps for each candidate clock point. In some embodiments, the values will be 0 ps, +100 ps, and −100 ps, where t=100. In an example with two candidate clock points (K=2; $3^K$=9), the combinations of delay adjustment values may appear similar to Table 2 above.

At 610, the method 600 may include, for each combination, obtaining the cost of a clock network design using the combination. In some embodiments, the cost includes a total negative slack (TNS), determined using, e.g., an STA system or ECO system.

From here, the process may identify a combination that is the most promising (which may include eliminating all other combinations that are least promising). At 612, the method 600 may include selecting the combination with the most optimized cost, e.g., highest TNS reduction. In some embodiments, if it is determined at 614 that this combination is 0 ps as the delay adjustment value for each clock point (e.g., a combination of 0 ps and 0 ps, such as combination #1 in Table 2), this process may terminate. Intuitively, if no adjustment in the delay is needed, then there is no further need for optimization. If this combination contains a non-zero value, the method proceeds to 616, where the method 600 may include, for each candidate clock point that is associated with a non-zero delay adjustment value, recording the delay adjustment value for that clock point (e.g., +100 ps for a first clock point) and removing that clock point from the list of candidate clock points for which to test values using enumeration.

The method 600 may then loop back to 604, but with t set to t−10 (at 618), which in this example would have the effect of setting the combination of delay adjustment values to 0 ps, +90 ps, and −90 ps, where t=90 (=100−10). Based on this iterative and enumerative process, another delay adjustment value having, e.g., the most TNS reduction, may be identified. For example, the delay adjustment value having the most TNS reduction in the next iteration may be +90 ps. This delay adjustment value may be recorded.

An example function to accomplish the above process is shown below as pseudocode:

```
1    Procedure Enumeration on_Delay_Values_for_N_Seeds {
2    Initialize list = { N seeds }
3    for (t = 100; t > 0; t−= 10) {
4       three delay adjustment value options = (0 ps, +t ps, −t ps)
5       K = size of current list
6       create 3^K combinations of target delay adjustment on each seed
7       timing analysis for each combination
8       select the combination with the most optimized cost {
9          if all seeds are with 0 ps target delay { break for-loop
      }
10       else {
11          for each seed not with 0 ps target delay {
12             record its target delay adjustment
13             remove it from list in next for-loop
14          }
15       }
16    }
17  }
18    return recorded target delay adjustment values of all seeds
19 }
```

Figure 7:
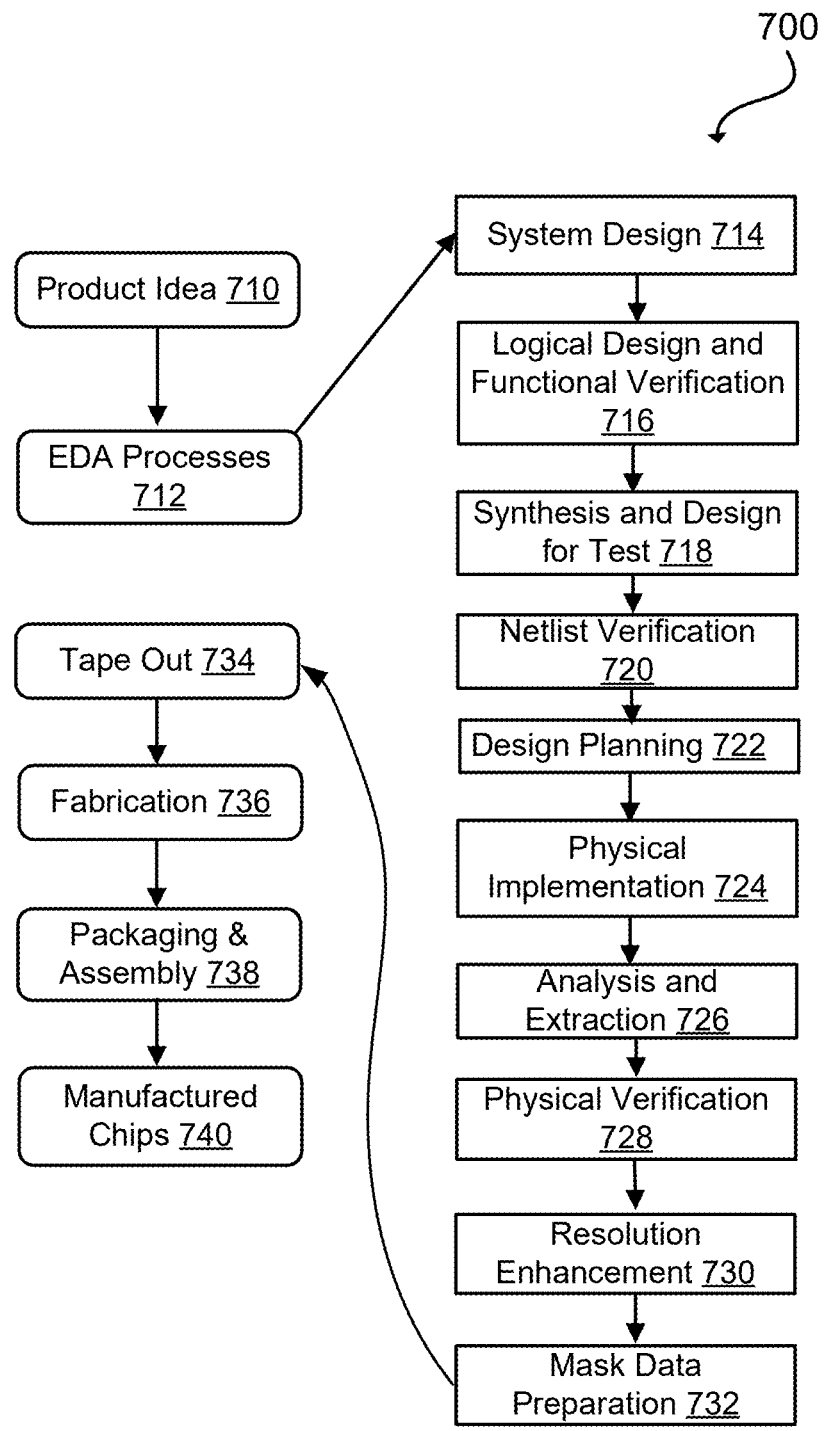
FIG. 7 depicts a flowchart of various processes used during the design and manufacture of an integrated circuit in accordance with some embodiments of the present disclosure.

FIG. 7 illustrates an example set of processes 700 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 710 with information supplied by a designer, information which is transformed to create an article of manufacture that uses a set of EDA processes 712. When the design is finalized, the design is taped-out 734, which is when artwork (e.g., geometric patterns) for the integrated circuit is sent to a fabrication facility to manufacture the mask set, which is then used to manufacture the integrated circuit. After tapeout, a semiconductor die is fabricated 736 and packaging and assembly processes 738 are performed to produce the finished integrated circuit 740.

Specifications for a circuit or electronic structure may range from low-level transistor material layouts to high-level description languages. A high-level of representation may be used to design circuits and systems, using a hardware description language ('HDL') such as VHDL, Verilog, System Verilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 5. The processes described by be enabled by EDA products (or tools).

During system design 714, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 716, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 718, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 720, the netlist is checked for compliance with timing constraints and for correspondence with the HDL code. During design planning 722, an overall floor plan for the integrated circuit is constructed and analyzed for timing and top-level routing.

During layout or physical implementation 724, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 726, the circuit function is verified at the layout level, which permits refinement of the layout design. During physical verification 728, the layout design is checked to ensure that manufacturing constraints are correct, such as DRC constraints, electrical constraints, lithographic constraints, and that circuitry function matches the HDL design specification. During resolution enhancement 730, the geometry of the layout is transformed to improve how the circuit design is manufactured.

During tape-out, data is created to be used (after lithographic enhancements are applied if appropriate) for production of lithography masks. During mask data preparation 732, the 'tape-out' data is used to produce lithography masks that are used to produce finished integrated circuits.

A storage subsystem of a computer system (such as computer system 700 of FIG. 7) may be used to store the programs and data structures that are used by some or all of the EDA products described herein, and products used for development of cells for the library and for physical and logical design that use the library.

FIG. 8 illustrates an example machine of a computer system 800 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM), a static memory 806 (e.g., flash memory, static random access memory (SRAM), etc.), and a data storage device 818, which communicate with each other via a bus 830.

Processing device 802 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 may be configured to execute instructions 826 for performing the operations and steps described herein.

The computer system 800 may further include a network interface device 808 to communicate over the network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), a graphics processing unit 822, a signal generation device 816 (e.g., a speaker), graphics processing unit 822, video processing unit 828, and audio processing unit 832.

The data storage device 818 may include a machine-readable storage medium 824 (also known as a non-transitory computer-readable medium) on which is stored one or more sets of instructions 826 or software embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media.

In some implementations, the instructions 826 include instructions to implement functionality corresponding to the present disclosure. While the machine-readable storage medium 824 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 802 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

The invention claimed is:

1. A method for obtaining timing delay adjustment values for clock points in a clock network, the method comprising:
   selecting a set of one or more candidate clock points from a plurality of clock points of the clock network; and
   determining, by a processing device, a desired combination of timing delay adjustment values using each candidate clock point in the set of one or more candidate clock points, by:
      performing a first plurality of iterations with respect to initial timing delay adjustment values by creating a plurality of combinations of the initial timing delay adjustment values for the set of one or more candidate clock points, wherein a different combination of the initial timing delay adjustment values is created for each iteration of the first plurality of iterations;
      performing a second plurality of iterations with respect to a selected combination of the plurality of combinations of the initial timing delay adjustment values for the set of one or more candidate clock points, the selected combination selected based on the first plurality of iterations, the second plurality of iterations comprising testing a plurality of combinations of timing delay adjustment values of the selected combination, wherein a different combination of the timing delay adjustment values is tested for each iteration of the second plurality of iterations; and
      determining the desired combination based on the testing of the plurality of combinations of timing delay adjustment values of the selected combination.

2. The method of claim 1, wherein the performing of the first plurality of iterations comprises (i) identifying the plurality of combinations of initial timing delay adjustment values for the one or more candidate clock points, and (ii) determining a combination of initial timing delay adjustment values which results in a highest amount of cost function reduction associated with the one or more candidate clock points.

3. The method of claim 2, wherein the performing the second plurality of iterations comprises (i) determining an increment to be applied to an initial timing delay adjustment value associated with one of the one or more candidate clock points to create the plurality of combinations of timing delay adjustment values of the selected combination, and (ii) determining a combination of timing delay adjustment values of the plurality of combinations of timing delay adjustment values which results in a highest amount of cost function reduction associated with the one or more candidate clock points.

4. The method of claim 3, wherein the cost function reduction comprises a reduction of total negative timing slack.

5. The method of claim 1, wherein the set of one or more candidate clock points is selected from at least a hierarchical level other than a leaf level of the clock network.

6. The method of claim 1, wherein the selecting of the set of one or more candidate clock points from the plurality of clock points comprises (i) determining one or more timing violations associated with the plurality of clock points, (ii) based on the one or more timing violations, determining a weight value for each of at least a portion of the plurality of clock points, and (iii) identifying one or more clock points having highest weight values.

7. The method of claim 6, wherein the determining of the one or more timing violations comprises (i) determining, with respect to the plurality of clock points, arrival times of a signal generated by a source clock, and (ii) determining a disparity between the arrival times.

8. The method of claim 1, further comprising, based at least on the determined timing delay adjustment values, obtaining a data structure configured to be implemented by a design system;

wherein the data structure comprises an engineering change order (ECO) file comprising the determined timing delay adjustment values, and the design system comprises an ECO system configured to effect one or more physical changes to at least one of the set of one or more candidate clock points based on the ECO file.

9. The method of claim 8, wherein the clock network comprises multiple hierarchical levels, the multiple hierarchical levels comprising a leaf level and a higher level, the hierarchical level other than the leaf level comprising the higher level, and the ECO system is configured to effect the one or more physical changes to at least the higher level.

10. The method of claim 1, wherein the selecting of the set of one or more candidate clock points is based on an operational parameter that modifies an operational aspect of the selecting.

11. A method for obtaining timing delay adjustment values for clock points in a clock network, the method comprising:

identifying a plurality of clock points in the clock network;
determining one or more timing violations in at least a portion of the plurality of clock points;
associating a cumulative weight to each clock point based on the determined one or more timing violations;
selecting a set of one or more clock points based on the cumulative weight associated to each clock point;
performing a first enumeration of initial timing delay adjustment values algorithmically tested with respect to the selected set of one or more clock points;
determining a combination of initial timing delay adjustment values for the selected set of one or more clock points based on the first enumeration;
performing a second enumeration of timing delay adjustment values algorithmically tested in increments on the determined combination of initial timing delay adjustment values; and
determining a combination of timing delay adjustment values for the selected set of one or more clock points based on the second enumeration.

12. The method of claim 11, wherein:
the selected set of one or more clock points comprises K clock points;
the initialized set of initial timing delay adjustment values comprises N initial timing delay adjustment values; and
the first enumeration results in $N^K$ combinations of the initial timing delay adjustment values based on the N initial timing delay adjustment values and the K clock points, wherein N and K are positive integers.

13. The method of claim 11, wherein the performing of the second enumeration of timing delay adjustment values comprises adjusting at least one of the determined combination of initial timing delay adjustment values in increments from a first end of a range of timing delay adjustment values to a second end.

14. A system comprising:
a memory storing instructions; and
a processor, coupled with the memory and to execute the instructions, the instructions configured to, when executed, cause the processor to:
select a set of one or more candidate clock points from a plurality of clock points of a clock network; and
determine a desired combination of timing delay adjustment values using each candidate clock point in the set of one or more candidate clock points, based on:
a first plurality of iterations with respect to initial timing delay adjustment values, the first plurality of iterations comprising a creation of a plurality of combinations of the initial timing delay adjustment values for the set of one or more candidate clock points, wherein a different combination of the initial timing delay adjustment values is created for each iteration of the first plurality of iterations;
a second plurality of iterations with respect to a selected combination of the plurality of combinations of the initial timing delay adjustment values for one or more of the set of one or more candidate clock points, the selected combination selected based on the first plurality of iterations, the second plurality of iterations comprising testing a plurality of combinations of timing delay adjustment values of the selected combination, wherein a different combination of the timing delay adjustment values is tested for each iteration of the second plurality of iterations; and
determine the desired combination based on the second plurality of iterations.

15. The system of claim 14, wherein the first plurality of iterations comprises (i) identification the plurality of combinations of initial timing delay adjustment values for the one or more candidate clock points, and (ii) determination of a combination of initial timing delay adjustment values which results in a highest amount of cost function reduction associated with the one or more candidate clock points.

16. The system of claim 14, wherein the second plurality of iterations comprises (i) determination of an increment to be applied to an initial timing delay adjustment value associated with one of the one or more candidate clock points to create the plurality of combinations of timing delay adjustment values of the selected combination, and (ii) determination of a combination of timing delay adjustment values of the plurality of combinations of timing delay adjustment values which results in a highest amount of cost function reduction associated with the one or more candidate clock points.

17. The system of claim 14, wherein the selection of the set of one or more candidate clock points from the plurality of clock points comprises (i) determination of one or more timing violations associated with the plurality of clock points, (ii) based on the one or more timing violations, determination of a weight value for each of at least a portion of the plurality of clock points, and (iii) identification of one or more clock points having highest weight values.

18. The system of claim 14, wherein the instructions are further configured to, when executed, cause the processor to, based at least on the determined timing delay adjustment values, obtain a data structure configured to be implemented by a design system;

wherein the data structure comprises an engineering change order (ECO) file comprising the determined timing delay adjustment values, and the design system comprises an ECO system configured to effect one or more physical changes to at least one of the set of one or more candidate clock points based on the ECO file.

19. The system of claim 18, wherein the clock network comprises multiple hierarchical levels, the multiple hierarchical levels comprising a leaf level and a higher level, the hierarchical level other than the leaf level comprising the higher level, and the ECO system is configured to effect the one or more physical changes to at least the higher level.

20. The system of claim 14, wherein the selection of the set of one or more candidate clock points is based on a specified operational parameter that modifies an operational aspect of the selection.

* * * * *